(12) United States Patent
Anderson et al.

(10) Patent No.: US 7,973,096 B2
(45) Date of Patent: Jul. 5, 2011

(54) ANTIMICROBIAL NANOPARTICLES

(75) Inventors: Kelly S. Anderson, Houlton, WI (US);
Babu N. Gaddam, Woodbury, MN (US);
Alphonsus V. Pocius, Maplewood, MN (US); Jeremy M. Yarwood, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/936,949

(22) PCT Filed: Mar. 30, 2009

(86) PCT No.: PCT/US2009/038744
§ 371 (c)(1), (2), (4) Date: Oct. 8, 2010

(87) PCT Pub. No.: WO2009/137188
PCT Pub. Date: Nov. 12, 2009

(65) Prior Publication Data
US 2011/0028591 A1 Feb. 3, 2011

Related U.S. Application Data

(60) Provisional application No. 61/051,154, filed on May 7, 2008.

(51) Int. Cl.
*C09D 5/16* (2006.01)
*B05D 3/10* (2006.01)
*C08F 2/48* (2006.01)

(52) U.S. Cl. ............ 523/122; 427/385.5; 427/387; 427/388.1; 427/393; 427/393.6; 427/508; 428/704; 524/400; 524/492; 528/392; 528/422

(58) Field of Classification Search .......... 523/122; 427/385.5, 387, 388.1, 393, 393.6, 508; 428/704; 524/400, 492; 528/392, 422
See application file for complete search history.

(56) References Cited

U.S. PATENT DOCUMENTS

| | | |
|---|---|---|
| 5,545,676 A | 8/1996 | Palazzotto et al. |
| 5,954,869 A | 9/1999 | Elfersy et al. |
| 7,064,152 B2 | 6/2006 | Kalgutkar et al. |
| 7,241,437 B2 | 7/2007 | Davidson et al. |
| 2002/0128336 A1 | 9/2002 | Kolb et al. |
| 2003/0114553 A1 | 6/2003 | Karim et al. |
| 2006/0105052 A1 | 5/2006 | Acar et al. |
| 2010/0178512 A1* | 7/2010 | Giesenberg et al. .......... 428/405 |
| 2010/0196280 A1 | 8/2010 | Fischer et al. |

FOREIGN PATENT DOCUMENTS

| | | |
|---|---|---|
| DE | 10008306 | 9/2010 |
| WO | WO 2004/105687 | 12/2004 |
| WO | WO 2006/110166 | 10/2006 |
| WO | WO 2007/141050 | 12/2007 |

OTHER PUBLICATIONS

PCT International Search Report, PCT/US2009/038744, Aug. 2009.

\* cited by examiner

*Primary Examiner* — Kriellion A Sanders
(74) *Attorney, Agent, or Firm* — Kent S. Kokko

(57) ABSTRACT

A polymerizable composition, comprising a first component comprising a cationic nanoparticle comprising a covalently bonded ammonium group, and a second component comprising an anionic polyether compound is described. Either the first component further comprises an ethylenically unsaturated polymerizable group, the second component further comprises an ethylenically unsaturated polymerizable anion, or both. A method of making an article comprising applying the polymerizable composition to a surface of an article is also described.

17 Claims, No Drawings

US 7,973,096 B2

ANTIMICROBIAL NANOPARTICLES

CROSS REFERENCE TO RELATED APPLICATIONS

This application is a national stage filing under 35 U.S.C. 371 of PCT/US2009/038744, filed Mar. 30, 2009, which claims priority to Provisional Application No. 61/051,154, filed May 7, 2008, the disclosure of which is incorporated by reference in its/their entirety herein.

BACKGROUND

There can be uncontrolled growth of microorganisms (such as bacteria or fungi) in aqueous environments. The growth of microorganisms can result in, for example, microbial contamination of an aqueous medium, the formation of a biofilm on a surface exposed to an aqueous medium, or both. A biofilm can serve as a reservoir of microorganisms that can contaminate a sterile or sterilized aqueous environment in contact with it. Many surfaces can be susceptible to biofilm formation, including those in industrial equipment (such as water treatment equipment and pulp- and paper-making equipment), and in medical equipment and devices (such as catheters and electrodes). On, for example, surfaces of drinking water treatment facilities and pulp- and paper-making facilities, the growth of microorganisms can lead to contamination and to surface biofilm growth that can require cleaning and repairs. On, for example, surfaces of medical devices, such as surfaces of catheters or electrodes, the formation and growth of a biofilm can lead to a need to remove or replace the medical device.

Approaches to controlling or eliminating the growth of microorganisms in an aqueous environment, the formation of a biofilm on a surface exposed to an aqueous environment, or both, have included sterilization of the aqueous environment or the use of surfaces that inhibit the adhesion of microorganisms and biofilms.

SUMMARY

There is a need for antimicrobial nanoparticles and compositions comprising them to prepare antimicrobial surfaces.

In one aspect, a polymerizable composition is provided comprising
a) a first cationic nanoparticle component comprising
  i) cationic covalently bonded ammonium groups and;
  ii) optionally comprising covalently bonded ethylenically unsaturated polymerizable groups; and
b) a second anionic component comprising
  i) an anionic polyether compound and
  ii) optionally an ethylenically unsaturated polymerizable anionic compound,
wherein the polymerizable composition comprises at least one of a) ii). or b) ii).

In another aspect, a method of making a coated article is provided. The method comprises providing an article having a surface, and providing the polymerizable composition to a surface thereof, and polymerizing the composition. In yet another aspect, a coated article is provided the polymerized composition coated thereon, thereby providing an antimicrobial surface thereto.

DETAILED DESCRIPTION

In several places throughout the application, guidance is provided through lists of examples, which examples can be used in various combinations. In each instance, the recited list serves only as a representative group and should not be interpreted as an exclusive list.

Any recitation of numerical ranges by endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, "a" cationic nanoparticle can be interpreted to mean "one or more" cationic nanoparticles.

The term "nanoparticle" refers to an inorganic particle having a particle diameter or particle size of not greater than 200 nanometers.

The terms "particle diameter" and "particle size" refer to the maximum cross-sectional dimension of a particle. If the particle is present in the form of an aggregate, the terms "particle diameter" and "particle size" refer to the maximum cross-sectional dimension of the aggregate.

The term "cationic nanoparticle" refers to a nanoparticle have a surface comprising a cationic group that is covalently bonded to the nanoparticle.

The term "alkoxy" refers to a group of formula —OR where R is an alkyl group.

The term "alkyl" refers to a monovalent moiety formed by abstraction of a hydrogen atom from an alkane. The alkyl can have a linear structure, branched structure, cyclic structure, or combinations thereof. A cycloalkyl is a cyclic alkyl and is a subset of an alkyl group.

The term "alkylene" refers to a divalent moiety formed by abstraction of two hydrogen atoms from an alkane. The alkylene can have a linear structure, branched structure, cyclic structure, or combinations thereof.

The term "aryl" refers to a monovalent moiety of a carbocyclic aromatic compound having one to five connected rings, multiple fused rings, or combinations thereof. In some embodiments, the aryl group has four rings, three rings, two rings, or one ring. For example, the aryl group can be phenyl.

The term "arylene" refers to a divalent moiety of a carbocyclic aromatic compound having one to five connected rings, multiple fused rings, or combinations thereof. In some embodiments, the arylene group has four rings, three rings, two rings, or one ring. For example, the arylene group can be phenylene.

The term "halo" refers to chlorine, bromine, or fluorine.

The term "heteroalkane" refers to an alkane having one or more carbon atoms replaced with a sulfur, oxygen, or $NR^d$ where $R^d$ is hydrogen or alkyl. The heteroalkane can have a linear structure, branched structure, cyclic structure, or combinations thereof. In some embodiments, the heteroalkane includes no more than twenty carbon atoms, no more than ten carbon atoms, no more than eight carbon atoms, no more than six carbon atoms, or no more than four carbon atoms. Ethers and polyethers are subsets of a heteroalkane.

The term "heteroalkyl" refers to a monovalent moiety formed by abstraction of a hydrogen atom from a heteroalkane.

The term "heteroalkylene" refers to a divalent moiety formed by abstraction of two hydrogen atoms from a heteroalkane.

The term (meth)acrylate is inclusive of both acrylate and methacrylate groups.

A polymerizable composition is provided, comprising a first component comprising a cationic nanoparticle comprising a covalently bonded ammonium group.

The cationic nanoparticle can comprise an oxide of a non-metal an oxide of a metal, or both. An oxide of a non-metal includes an oxide of, for example, silicon or germanium. An oxide of a metal includes an oxide of, for example, titanium, cerium, aluminum, or zirconium. Suitable nanoparticles include colloidal silica nanoparticles, such as Nalco 2326, available from Nalco Co., Naperville, Ill., and zirconia nanoparticles, such as those described in, for example, U.S. Pat. No. 7,241,437 (Davidson, et al.).

The nanoparticle can have an average particle size no greater than 200 nm, no greater than 150 nanometers, no greater than 100 nanometers, no greater than 75 nanometers, no greater than 50 nanometers, no greater than 25 nanometers, no greater than 20 nanometers, no greater than 15 nanometers, or no greater than 10 nanometers. The cationic nanoparticle can have an average particle size of at least 100 nanometers, at least 70 nanometers, at least 50 nanometers, at least 25 nanometers, at least 15 nanometers, at least 5 nanometers, at least 2 nanometers, or at least 1 nanometer.

Preferably the inorganic nanoparticles are silica nanoparticles in an aqueous or in a water/organic solvent mixture and having and average primary particle diameter of 40 nanometers or less, preferably 20 nanometers or less, and more preferably 10 nanometers or less. The average particle size may be determined using transmission electron microscopy.

Colloidal silica nanoparticles in aqueous media are well known in the art and available commercially. Silica sols in water or water-alcohol solutions are available commercially under such trade names as LUDOX (manufactured by E.I. duPont de Nemours and Co., Inc., Wilmington, Del., USA), NYACOL (available from Nyacol Co., Ashland, Mass.) or NALCO (manufactured by Ondea Nalco Chemical Co., Oak Brook, Ill. USA). One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "Remasol SP30," commercially available from Remet Corp., and "LUDOX SM," commercially available from E.I. Du Pont de Nemours Co., Inc.

The cationic nanoparticle comprises a covalently bonded ammonium group. The covalently bonded ammonium group can be of Formula I:

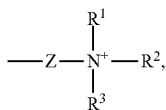

(I)

wherein $R^1$, $R^2$, and $R^3$ are each independently a hydrogen atom, an alkyl or heteroalkyl group, an aryl group, or $R^2$ and $R^3$ together form a ring, wherein not more than two of $R^1$, $R^2$, and $R^3$ is a hydrogen atom, and wherein Z is a divalent spacer group.

In some embodiments, $R^1$, $R^2$, and $R^3$ are each independently an alkyl or heteroalkyl group having 1 to 20 carbon atoms, an aryl group having 4 to 10 carbon atoms, or $R^2$ and $R^3$ together form a ring. The groups $R^1$, $R^2$, and $R^3$ can each independently be an alkyl or heteroalkyl group having at least 1 carbon atom, at least 2 carbon atoms, at least 3 carbon atoms, at least 4 carbon atoms, at least 6 carbon atoms, at least 8 carbon atoms, at least 10 carbon atoms, at least 12 carbon atoms, at least 14 carbon atoms, or at least 16 carbon atoms. The groups $R^1$, $R^2$, and $R^3$ can each independently be an alkyl or heteroalkyl group having no greater than 20 carbon atoms, no greater than 18 carbon atoms, no greater than 16 carbon atoms, no greater than 14 carbon atoms, or no greater than 10 carbon atoms. The alkyl or heteroalkyl group can independently comprise linear, branched, or cyclic structures. Non-limiting examples of alkyl groups include methyl, ethyl, propyl, isopropyl butyl, 2-butyl, pentyl, hexyl, octyl, decyl, dodecyl, iso-tridecyl, tetratecyl, hexadecyl, octadecyl, and eicosyl groups. In some embodiments, at least one of $R^1$, $R^2$, and $R^3$ is a methyl group. In some embodiments, at least two of $R^1$, $R^2$, and $R^3$ are each independently an alkyl group having at least 10 carbon atoms. Non-limiting examples of heteroalkyl groups include methoxyethyl, ethoxyethyl, methoxybutyl, ethoxyhexyl, poly(ethylene oxide), and poly(propylene oxide) groups.

The groups $R^1$, $R^2$, and $R^3$ can each independently be an aryl group having at least 6 carbon atoms, at least 7 carbon atoms, at least 8 carbon atoms, or at least 9 carbon atoms. Non-limiting examples of aryl groups include unsubstituted phenyl and substituted phenyl.

The divalent spacer group Z can comprise an alkylene group, a heteroalkylene group, or an arylene group. In some embodiments, the divalent spacer group Z comprises at least 3 carbon atoms. Non-limiting examples of the divalent spacer group Z include propylene groups, butylene groups, hexylene groups, octylene groups, decylene groups, dodecylene groups, tetradecylene groups, hexadecylene groups, octadecylene groups, and phenylene groups.

The covalently bonded ammonium group can comprise a pyridinium group of Formula II:

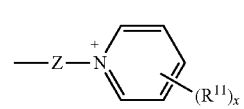

(II)

wherein Z is as described above, each $R^{11}$ is independently a hydrogen atom, an alkyl group, or a halo group, and x is an integer of 1 to 5. In some embodiments, $R^{11}$ is a hydrogen atom and x is 5. In some embodiments, $R^{11}$ is a methyl group and x is an integer of 1 to 5. In some embodiments, $R^{11}$ is a methyl group and x is 1 (e.g., the covalently bonded ammonium group is a 2-methylpyridinium group or a 4-methylpyridinium group).

The ammonium group can be covalently bonded to a nanoparticle via a covalent bond between any atom on the nanoparticle (e.g., a non-metal atom, a metal atom, or an oxygen atom) and any atom (e.g., a carbon atom, an oxygen atom, a silicon atom, or a nitrogen atom) on the ammonium group. In a preferred embodiment the nanoparticles are silica nanoparticles where the ammonium groups are covalently bonded by a siloxane bond (Si—O—).

In some embodiments, the cationic nanoparticle is the reaction product of an inorganic nanoparticle and a surface-modifying compound. The surface-modifying compound can comprise a trialkoxysilane groups (such as a trimethoxysilane group or a triethoxysilane group) that reacts with a group (such as an OH group) on the surface of the nanoparticle to form a covalent bond (such as a Si—O bond) between the nanoparticle and the surface-modifying compound.

In another embodiment the surface modifying compound can be a covalently bonded ammonium group of Formula III:

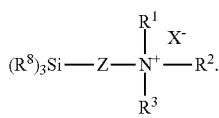

(III)

wherein $R^1$, $R^2$, $R^3$, and Z are as described above, each $R^8$ is independently selected from the group consisting of hydroxy groups, alkoxy groups, acyl groups, acyloxy groups, halo groups, and polyether groups, and $X^-$ is a monovalent anion such as a carboxylate, a sulfonate, or a halide. In some embodiments, each $R^8$ is independently hydroxy, methoxy, ethoxy, acetyl, or acetoxyl. In some embodiments, $X^-$ is chloride or bromide. A non-limiting compound of Formula III is N,N-didecyl-N-methyl-N-(3-trimethoxysilylpropyl)ammonium chloride, available from Gelest, Inc., Morrisville, Pa. A reaction product of an inorganic nanoparticle and a surface-modifying compound of Formula III can comprise an ammonium group covalently bonded to the nanoparticle via a siloxane linkage.

In some embodiments, the cationic nanoparticle can be reaction product of a surface-modifying compound comprising an amino group can be of Formula IV. This reaction product, which provides a covalently bonded amine group, may be subsequently reacted with an alkylating agent to provide a covalently bonded ammonium group.

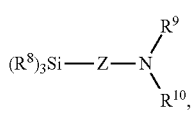

(IV)

wherein $R^9$ and $R^{10}$ are each independently an alkyl or heteroalkyl group, an aryl group, or $R^9$ and $R^{10}$ together form a ring, and Z and $R^8$ are as described above. In some embodiments, $R^9$ and $R^{10}$ are each independently an alkyl or heteroalkyl group having 1 to 20 carbon atoms, an aryl group having 4 to 10 carbon atoms, or $R^9$ and $R^{10}$ together form a ring. The groups $R^9$ and $R^{10}$ can each independently be an alkyl or heteroalkyl group having at least 1 carbon atom, at least 2 carbon atoms, at least 3 carbon atoms, at least 4 carbon atoms, at least 6 carbon atoms, at least 8 carbon atoms, at least 10 carbon atoms, at least 12 carbon atoms, at least 14 carbon atoms, or at least 16 carbon atoms. The groups $R^9$ and $R^{10}$ can each independently be an alkyl or heteroalkyl group having no greater than 20 carbon atoms, no greater than 18 carbon atoms, no greater than 16 carbon atoms, no greater than 14 carbon atoms, or no greater than 10 carbon atoms.

The alkyl or heteroalkyl group can independently comprise linear, branched, or cyclic structures. Non-limiting examples of alkyl groups include methyl, ethyl, propyl, isopropyl butyl, 2-butyl, pentyl, hexyl, octyl, decyl, dodecyl, iso-tridecyl, tetratecyl, hexadecyl, octadecyl, and eicosyl groups. Non-limiting examples of heteroalkyl groups include methoxyethyl, ethoxyethyl, methoxybutyl, ethoxyhexyl, poly(ethylene oxide), and polypropylene oxide) groups. In some embodiments, the cationic nanoparticle can be reaction product of an alkylating agent and the reaction product of an inorganic nanoparticle and a compound of Formula IV.

Non-limiting examples of alkylating agents include methyl bromide, methyl iodide, ethyl bromide, methyl trifluoromethanesulfonate, butyl iodide, hexyl bromide, hexyl toluenesulfonate, decyl bromide, dodecyl iodide, and tetradecyl bromide. A non-limiting compound of Formula IV is 3-aminopropyltrimethoxysilane, available from Sigma Aldrich Co., St. Louis, Mo. A reaction product of an inorganic nanoparticle and a surface-modifying compound of Formula IV (after subsequent reaction with, e.g., an alkylating agent) can comprise an ammonium group covalently bonded to the nanoparticle via a siloxane linkage.

The cationic nanoparticle can comprise an ethylenically unsaturated polymerizable group. The ethylenically unsaturated polymerizable group can be covalently bonded to the nanoparticle. The ethylenically unsaturated polymerizable group can be any ethylenically unsaturated polymerizable group, for example a vinyl group or a (meth)acrylate group. In embodiments wherein the cationic nanoparticle further comprises an ethylenically unsaturated polymerizable group, the ethylenically unsaturated polymerizable group can be covalently bonded to the cationic nanoparticle. The ethylenically unsaturated polymerizable group can be covalently bonded to a cationic nanoparticle via a covalent bond between any atom on the nanoparticle (e.g., a non-metal atom, a metal atom, or an oxygen atom) and any atom (e.g., a carbon atom, an oxygen atom, a silicon atom, or a nitrogen atom) on the ethylenically unsaturated polymerizable group.

In some embodiments, the cationic nanoparticle further comprising an ethylenically unsaturated polymerizable group is a reaction product of a cationic nanoparticle and a surface-modifying compound having an ethylenically unsaturated polymerizable group. The surface-modifying compound having an ethylenically unsaturated polymerizable group can comprise a trialkoxysilane groups (such as a trimethoxysilane group or a triethoxysilane group) that reacts with a group (such as an OH group) on the surface of the nanoparticle to form a covalent bond (such as a Si—O bond) between the nanoparticle and the surface-modifying compound. Non-limiting examples of surface-modifying compounds having an ethylenically unsaturated polymerizable group include vinyltrimethoxysilane and 3-(methacryloxypropyl)trimethoxysilane. Such surface modifying compounds may have the general formula:

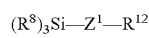 (VI), where each $R^8$ is independently selected from the group consisting of hydroxy groups, alkoxy groups, acyl groups, acyloxy groups, halo groups, and polyether groups, $Z^1$ is divalent spacer group Z can comprise an alkylene group, a heteroalkylene group, or an arylene group. In some embodiments, the divalent spacer group Z comprises at least 3 carbon atoms. Non-limiting examples of the divalent spacer group Z include propylene groups, butylene groups, hexylene groups, octylene groups, decylene groups, dodecylene groups, tetradecylene groups, hexadecylene groups, octadecylene groups, and phenylene groups, and $R^{12}$ is an ethylenically unsaturated, polymerizable group including such as a (meth)acrylate group, a (meth)acrylamide group, or a vinyl group.

With respect to the cationic nanoparticles, the amount of covalently bonded ammonium groups of Formula I is such that 80 to 100% of the available functional groups on the surface of the nanoparticles are functionalized with an ammonium group; and 0 to 20% (Preferably 1 to 5%) of the available surface groups are functionalized with covalently bonded ethylenically unsaturated polymerizable groups.

Put differently, the nanoparticles are reacted compounds of Formulas (III) and/or (IV) in amounts sufficient to react with 80 to 100% of the available functional groups on the inorganic nanoparticle (for example, the number of available hydroxyl functional groups on silica nanoparticles). The number of functional groups is experimentally determined where a quantity of nanoparticles is reacted with an excess of surface modifying agent (of Formulas (III) or (IV)) so that all available reactive sites are functionalized with a surface modifying agent. Lower percentages of functionalization may then be calculated from the result. Similarly, the nanoparticles may be reacted with compounds of Formula VI in amounts sufficient to react with 0 to 20% (preferably 1 to 5%) of the available functional groups on the inorganic nanoparticle.

The polymerizable composition comprises a second anionic component comprising an anionic polyether compound. The anionic polyether compound can comprise a compound of Formula V:

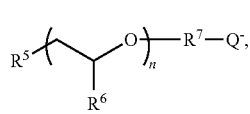

(V)

wherein $R^5$ is a hydrogen atom, an alkyl group, an aryl group, an aralkyl group, or an alkaryl group, or comprises an ethylenically unsaturated polymerizable group, each $R^6$ is independently a hydrogen atom or a methyl group, or comprises an ethylenically unsaturated polymerizable group, $R^7$ is an alkylene group or an arylene group, $Q^-$ is an anionic group selected from the group consisting of carboxylate, sulfonate, phosphate, and phosphonate, and n is an integer from 1 to 100.

The group $R^5$ can be any alkyl group, any aryl group, any aralkyl group, or any alkaryl group, or can comprise any ethylenically unsaturated polymerizable group. In some embodiments, $R^5$ is an alkyl group having 1 to 20 carbon atoms. The group $R^5$ can be an alkyl group having at least 1 carbon atom, at least 2 carbon atoms, at least 3 carbon atoms, at least 4 carbon atoms, at least 6 carbon atoms, at least 8 carbon atoms, at least 10 carbon atoms, at least 12 carbon atoms, at least 14 carbon atoms, or at least 16 carbon atoms. The group $R^5$ can be an alkyl group, an aryl group, an aralkyl group, or an alkaryl group having no greater than 20 carbon atoms, no greater than 18 carbon atoms, no greater than 16 carbon atoms, no greater than 14 carbon atoms, or no greater than 10 carbon atoms. The alkyl group can comprise linear, branched, or cyclic structures.

Non-limiting examples of alkyl groups include methyl, ethyl, propyl, isopropyl butyl, 2-butyl, pentyl, hexyl, octyl, decyl, dodecyl, iso-tridecyl, tetratecyl, hexadecyl, octadecyl, and eicosyl groups. In some embodiments, $R^5$ is an aryl group, an aralkyl group, or an alkaryl group comprising no greater than 20 carbon atoms. The group $R^5$ can be an aryl group, an aralkyl group, or an alkaryl group comprising no greater than 18 carbon atoms, no greater than 16 carbon atoms, no greater than 14 carbon atoms, no greater than 12 carbon atoms, no greater than 10 carbon atoms, or no greater than 8 carbon atoms. The group $R^5$ can be an aryl group, an aralkyl group, or an alkaryl group comprising at least 6 carbon atoms, at least 8 carbon atoms, at least 10 carbon atoms, or at least 12 carbon atoms. A non-limiting example of an aryl group includes phenyl. A non-limiting example of an aralkyl group includes benzyl. Non-limiting examples of alkaryl groups include alkylphenyl groups such as 4-methylphenyl, 2-methylphenyl, 4-butylphenyl, 4-octylphenyl, 4-nonylphenyl, 4-decylphenyl, 2-butylphenyl, 2,4-dimethylphenyl, and 3,5-dimethylphenyl.

The group $R^7$ can be any alkylene or any arylene group. For example, the group $R^7$ can be an alkylene group having at least 1 carbon atom, at least 2 carbon atoms, at least 3 carbon atoms, at least 4 carbon atoms, at least 6 carbon atoms, at least 8 carbon atoms, or at least 10 carbon atoms. The group $R^7$ can be an alkylene group having no greater than 14 carbon atoms, or no greater than 10 carbon atoms, no greater than 8 carbon atoms, no greater than 6 carbon atoms, or no greater than 4 carbon atoms. In some embodiments, $R^7$ is an ethylene group. In some embodiments, $R^7$ is a propylene group.

The group $R^7$ can be an arylene group comprising at least 6 carbon atoms, at least 8 carbon atoms, or at least 10 carbon atoms. The group $R^7$ can be an arylene group comprising no greater than 14 carbon atoms, no greater than 12 carbon atoms, no greater than 10 carbon atoms, or no greater than 8 carbon atoms. In some embodiments, R7 comprises a phenylene group.

The anionic polyether compound can comprise a polymerizable anionic polyether compound. In Formula V, the groups $R^5$, and $R^6$, can independently comprise an ethylenically unsaturated polymerizable group such as a (meth)acrylate group, a (meth)acrylamide group, or a vinyl group. In some embodiments, the anionic polyether compound comprises more than one ethylenically unsaturated polymerizable group. In some embodiments, the anionic polyether compound comprises one ethylenically unsaturated polymerizable group. In some embodiments, the anionic polyether compound is free of ethylenically unsaturated polymerizable groups.

In Formula V, n can be an integer of at least 1, at least 2, at least 5, at least 10, at least 15, at least 20, at least 30, at least 40, at least 50, at least 60, or at least 70. In Formula V, n can be an integer no greater than 100, no greater than 90, no greater than 80, no greater than 70, no greater than 50, no greater than 30, no greater than 25, no greater than 20, or no greater than 10.

The polymerizable composition can comprise a second component comprising a mixture of anionic polyether compounds of Formula V, each having different integer values of n. Such mixtures can have integer or non-integer average values of n.

In some embodiments, the anionic polyether compound is a compound of Formula V wherein $R^5$ is a 4-alkylphenyl group, $R^6$ is a hydrogen atom, $R^7$ is an alkylene group having one to 4 carbon atoms, $Q^-$ is carboxylate or sulfonate, and n is an integer having an average value of 10 to 30 In some embodiments, the anionic polyether compound is a compound of Formula V wherein $R^5$ is a 4-nonylphenyl group, $R^6$ is a hydrogen atom, $R^7$ is a propylene group, $Q^-$ is sulfonate, and n is an integer having an average value of 20.

The second anionic component can comprise an ethylenically unsaturated polymerizable anion. The second component can comprise any ethylenically unsaturated polymerizable anion. The ethylenically unsaturated polymerizable anion comprises an ethylenically unsaturated polymerizable group and an anionic group. The ethylenically unsaturated polymerizable group can be any ethylenically unsaturated polymerizable group, for example a vinyl group, a (meth) acrylamide group, or a (meth)acrylate group. The anionic group can be any anionic group, for example a carboxylate, sulfonate, phosphate, or phosphonate group. Non-limiting examples of ethylenically unsaturated polymerizable anions include sodium 2-acrylamido-2-methylpropanesulfonate and sodium acrylate. Such monomers may have the general formula:

$$R^{13}-Z^2-Q^{1-}, \qquad (VII),$$

where $Z^2$ is divalent spacer group Z can comprise an alkylene group, a heteroalkylene group, or an arylene group. In some embodiments, the divalent spacer group Z comprises at least 3 carbon atoms. Non-limiting examples of the divalent spacer group Z include propylene groups, butylene groups, hexylene groups, octylene groups, decylene groups, dodecylene groups, tetradecylene groups, hexadecylene groups, octadecylene groups, and phenylene groups, and $R^{13}$ is an ethylenically unsaturated, polymerizable group including such as a (meth)acrylate group, a (meth)acrylamide group, or a vinyl group and $Q^{1-}$ is an anionic group selected from the group consisting of carboxylate, sulfonate, phosphate, and phosphonate.

The polymerizable composition can further comprise a third component comprising an ethylenically unsaturated monomer. The third component can comprise any ethylenically unsaturated monomer. The ethylenically unsaturated monomer comprises an ethylenically unsaturated polymerizable group, that can be any ethylenically unsaturated polymerizable group (e.g., a vinyl group, a (meth)acrylamide group, or a (meth)acrylate group).

Non-limiting examples of ethylenically unsaturated monomers include monofunctional(meth)acrylate monomers and styrenic monomers. Monofunctional(meth)acrylate monomers include alkyl(meth)acrylates, aryl(meth)acrylates, and aralkyl(meth)acrylates. Alkyl(meth)acrylates can include at least one linear, branched, or cyclic structure. Non-limiting examples of alkyl(meth)acrylates include methyl methacrylate, ethyl methacrylate, n-butyl methacrylate, isobutyl methacrylate, tert-butyl methacrylate, neopentyl methacrylate, cyclohexyl methacrylate, isobornyl methacrylate, hexyl methacrylate, octyl methacrylate, isooctyl methacrylate, decyl methacrylate, dodecyl methacrylate, isotridecyl methacrylate, tetradecyl methacrylate, hexadecyl methacrylate, octadecyl methacrylate, eicosyl methacrylate, behenyl methacrylate, methyl acrylate, ethyl acrylate, n-butyl acrylate, isobutyl acrylate, tert-butyl acrylate, neopentyl acrylate, cyclohexyl acrylate, isobornyl acrylate, hexyl acrylate, octyl acrylate, isooctyl acrylate, decyl acrylate, dodecyl acrylate, isotridecyl acrylate, tetradecyl acrylate, hexadecyl acrylate, octadecyl acrylate, eicosyl acrylate, and behenyl acrylate. Non-limiting examples of aryl(meth)acrylates include phenyl methacrylate, phenyl acrylate, 4-methylphenyl methacrylate, 4-methylphenyl acrylate, 1-naphthyl methacrylate, 1-naphthyl acrylate, 2-naphthyl methacrylate, and 2-naphthyl acrylate.

Non-limiting examples of aralkyl(meth)acrylates include benzyl methacrylate and benzyl acrylate. Non-limiting examples of monofunctional styrenic monomers include styrene, alpha-methylstyrene, 2-methylstyrene, and 4-methylstyrene. Non-limiting examples of ethylenically unsaturated monomers include di- and polyfunctional(meth)acrylate monomers including 1,6-hexanediol diacrylate, 1,6-hexanediol dimethacrylate, trimethylolpropane trimethacrylate, trimethylolpropane triacrylate, and pentaerythritol triacrylate.

The polymerizable composition can be prepared by steps comprising a) preparing a first component comprising a cationic nanoparticle comprising a covalently bonded ammonium group, b) preparing a second component comprising an anionic polyether compound, and c) combining the first component and the second component. Either the first component further comprises an ethylenically unsaturated polymerizable group, the second component further comprises an ethylenically unsaturated polymerizable anion, or both. In some embodiments, a silica sol can be diluted with deionized water, and combined with a compound of Formula III and a surface-modifying compound having an ethylenically unsaturated polymerizable group. The reaction product of this mixture (a first component comprising a cationic nanoparticle comprising a covalently bonded ammonium group and an ethylenically unsaturated polymerizable group) can be isolated as a solid and can then be rinsed with water and ethanol and then dried in an oven. The dried solid can be combined with deionized water and an ethylenically unsaturated polymerizable anion (such as sodium 2-acrylamido-2-methylpropanesulfonate), and the mixture can be heated and stirred. An aqueous solution of a compound of Formula V can then be added to the mixture (the compound of Formula V further comprising a cation such as an alkali metal cation or an ammonium cation) and the resultant mixture can be heated and stirred. In some embodiments, the reaction product (a polymerizable composition comprising a first component comprising a cationic nanoparticle comprising a covalently bonded ammonium group, a second component comprising an anionic polyether compound, wherein the cationic nanoparticle and the second component independently further comprises an ethylenically unsaturated polymerizable group) separates from the aqueous mixture as a separate liquid phase that can be rinsed with deionized water and dried at room temperature.

The polymerizable composition can be a liquid at room temperature (i.e., at about 20° C.). Alternatively, the polymerizable composition can have a melting point of no greater than 25° C., no greater than 30° C., no greater than 40° C., or no greater than 50° C.

The polymerizable composition can be substantially insoluble in water (i.e., it can have solubility in water no greater than 10 weight percent, no greater than 5 weight percent, no greater than 2 weight percent, no greater than 1 weight percent, or no greater than 0.5 weight percent. The polymerizable composition can be insoluble in water. Alternatively, the polymerizable composition can be soluble in water (i.e., it can have solubility in water greater than 10 weight percent, greater than 20 weight percent, greater than 30 weight percent, or greater than 40 weight percent).

A method of making a coated article is provided. The method comprises providing an article having a surface, providing a polymerizable composition comprising a first component comprising a cationic nanoparticle comprising a covalently bonded ammonium group, and a second component comprising an anionic polyether compound, wherein either the first component further comprises an ethylenically unsaturated polymerizable group, the second component further comprises an ethylenically unsaturated polymerizable anion, or both.

The article, including a surface of the article, can comprise any material. The article, including a surface of the article, can comprise, for example, ceramic, silicate, metal, or polymer or polymer/wood composites. Ceramic articles include, for example ceramic tiles, ceramic cookware, and ceramic food preparation surfaces. Silicate articles include glass articles such as food preparation surfaces and food and/or water storage containers. Metal articles include articles such as metal pipes, metal storage containers (e.g., water storage containers or food storage containers), metal (e.g., stainless steel) food preparation surfaces.

The method further comprises applying the polymerizable composition to a surface of an article. As described above, the polymerizable composition can further comprise a third component comprising an ethylenically unsaturated monomer. The polymerizable composition can be applied to a surface of an article by any method. For example, the polymerizable composition can be applied to a surface of an article by immersing all or part of the article in the polymerizable composition, by spraying, brushing, or rolling the polymerizable composition of a surface of an article, or by flooding a surface of an article with the polymerizable composition.

The method further comprises polymerizing the composition. The polymerizing step can comprise, for example, heating the composition or directing actinic radiation to the composition. The actinic radiation can be of one or more wavelengths in the range 250 nanometers to 1200 nanometers.

In some embodiments, the polymerizable composition further comprises a polymerization initiator, in an amount sufficient to initiate polymerization of the composition. In some embodiments, the polymerization initiator comprises a thermal polymerization initiator. Non-limiting examples of thermal polymerization initiators include organic peroxides (e.g., benzoyl peroxide), and azo compounds (e.g., 2,2'-azobis (isobutyronitrile). Typically, the composition comprising a thermal polymerization initiator is heated to initiate polymerization and polymerize the composition.

In some embodiments, the polymerization initiator comprises a photochemical polymerization initiator, or a photochemical polymerization initiator system. Suitable photochemical initiator systems include those described in, for example, U.S. Pat. No. 7,064,152 (Kalgutkar, et al.) and U.S. Pat. No. 5,545,676 (Palazzotto et al.), and in U.S. Patent Application Publication No. 20030114553 (Karim, et al.).

Useful ultraviolet light-induced polymerization initiators include ketones, such as benzyl and benzoin, acyloins, and acyloin ethers. Ultraviolet light-induced polymerization initiators include 1-[4-(2-hydroxyethoxy)-phenyl]-2-hydroxy-2-methyl-1-propane-1-one available under the trade designation IRGACURE 2959, 2,2-dimethoxy-2-phenylacetophenone available under the trade designation IRGACURE 651 and benzoin methyl ether (2-methoxy-2-phenylacetophenone), all from Ciba, Tarrytown, N.Y.

Useful visible light-induced initiators include camphorquinone combined with a suitable hydrogen donor (e.g., an amine such ethyl 4-(N,N-dimethylamino)benzoate, aminoaldehydes and aminosilanes), and optionally a diaryliodonium simple or metal complex salt, chromophore-substituted halomethyl-s-triazine, or halomethyl oxadiazole. Particularly preferred visible light-induced photoinitiators include combinations of an alpha-diketone, e.g., camphorquinone with additional hydrogen donors, and optionally a diaryliodonium salt, e.g., diphenyliodonium chloride, bromide, iodide or hexafluorophosphate.

One type of suitable initiator (an initiator system) includes a three component or ternary photoinitiator system. This system includes an iodonium salt, e.g., a diaryliodonium salt, which can be a simple salt (e.g., containing an anion such as $Cl^-$, $Br^-$, $I^-$, or $C_2H_5SO_3^-$) or a metal complex salt (e.g., containing $SbF_5OH^-$ or $AsF_6^-$). Mixtures of iodonium salts can be used if desired. The second component is a sensitizer, which is capable of light absorption within the range of wavelengths of about 400 nm to about 1200 nm. The third component is an electron donor and includes amines (including aminoaldehydes and aminosilanes), amides (including phosphoramides), ethers (including thioethers), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid and salts of tetraphenylboronic acid.

Non-limiting examples of useful visible light sensitizers include camphorquinone, glyoxal, biacetyl, 3,3,6,6-tetramethylcyclohexanedione, 3,3,7,7-tetramethyl-1,2-cycloheptanedione, 3,3,8,8-tetramethyl-1,2-cyclooctanedione, 3,3,18,18-tetramethyl-1,2-cyclooctadecanedione, dipivaloyl, benzil, furil, hydroxybenzil, 2,3-butanedione, 2,3-pentanedione, 2,3-hexanedione, 3,4-hexanedione, 2,3-heptanedione, 3,4-heptanedione, 2,3-octanedione, 4,5-octanedione, and 1,2-cyclohexanedione.

Yet another type of photoinitiator includes acylphosphine oxides, such as those described in European Patent Application No. 173567 (Ying). Non-limiting examples of suitable acylphosphine oxides include bis(2,4,6-trimethylbenzoyl) phenyl phosphine oxide, for example. Tertiary amine reducing agents can be used in combination with an acylphosphine oxide. Useful tertiary amines include ethyl 4-(N,N-dimethylamino)benzoate and N,N-dimethylaminoethyl methacrylate.

The initiator system can be present in an amount sufficient to provide the desired rate of polymerization. For a photoinitiator, this amount can depend in part on the light source, the thickness of the polymerizable composition to be exposed to actinic radiation, and the extinction coefficient of the photoinitiator. In some embodiments, the initiator system is present in a total amount of at least 0.01 weight percent, at least 0.03 weight percent, or at least 0.05 weight percent, based on the weight of the composition. Preferably, the initiator system is present in a total amount of no greater than 10 weight percent, no greater than 5 weight percent, or no greater than 2.5 weight percent, based on the weight of the composition.

The polymerized composition can be substantially insoluble in water (i.e., it can have solubility in water no greater than 10 weight percent, no greater than 5 weight percent, no greater than 2 weight percent, no greater than 1 weight percent, or no greater than 0.5 weight percent). The polymerized composition can be insoluble in water.

The article comprises a surface comprising a polymerized composition. The surface can comprise an antimicrobial surface. In this context, the term "antimicrobial surface" refers to a surface upon which the growth of microorganisms is inhibited or prevented. Exemplary microorganisms include fungi and bacteria. Exemplary bacteria include Gram-positive bacteria such as species of *Staphylococcus, Streptococcus, Bacillus*, and *Clostridium*. Exemplary bacteria include Gram-negative bacteria such as species of *Escherichia, Salmonella, Aeromonas*, and *Campylobacter*. In some embodiments, an antimicrobial surface inhibits the growth of, or kills some or all bacteria deposited on it. In some embodiments, the antimicrobial surface can be evaluated according to the test method ASTM E2180-01 ("Standard Test for Determining the Activity of Incorporated Antimicrobial Agent(s) in Polymeric or Hydrophobic Materials").

The surface can comprise an antifouling surface. In this context, the term "antifouling surface" refers to a surface upon which the formation or growth of a biofilm (e.g., a bacterial biofilm) is inhibited or prevented. In some embodiments, the antifouling surface can be evaluated by using a flow cell in which a surface, first exposed to a growth medium comprising bacteria, is exposed to a sterile growth medium. Then, the presence or growth of a biofilm can be evaluated by staining (e.g., with crystal violet) any biofilm on the surface and visually inspecting the surface to determine if a biofilm is present. In some embodiments, the presence of a biofilm, or the presence of relatively more biofilm, is indicated by darker staining This method can be used comparatively, i.e., to compare the relative extent of biofilm formation of two or more samples.

EXAMPLES

Unless otherwise noted, all solvents and reagents were or can be obtained from Sigma Aldrich Co., St. Louis, Mo.

Preparatory Example 1

Preparation of a Polymerizable Composition

A silica sol (10.0 g; obtained as a 16 weight percent aqueous sol under the trade designation NALCO 2326 from Nalco Co., Naperville, Ill.) was combined with deionized water (25 mL). 3-(Methacryloyloxy)propyltrimethoxysilane (0.052 g) and N,N-didecyl-N-methyl-3-(trimethoxysilylpropyl)ammonium chloride (12.0 mL of a 42 percent solution in methanol; obtained from Gelest, Inc., Morrisville, Pa.) were added to the diluted silica sol. This mixture was periodically mixed by agitating the container over a period of 24 hours at room temperature. Then the white precipitated solid was isolated, washed three times with deionized water and two times with ethanol. The solid was then dispersed in ethanol and this mixture was poured into a dish. After the ethanol had evaporated, the solid was dried in an oven at 70° C. for 16 hours to afford an intermediate product.

A portion of the intermediate product (1.5 g) was combined with deionized water (10 mL) and sodium 2-acrylamido-2-methylpropane sulfonate (0.75 g of a 50 percent aqueous solution) in a screw cap vial. The vial was left in an oscillating water bath (approximately 70° C.; 110 rpm) for approximately 20 hours. Then a solution of poly(ethylene glycol)-4-nonylphenyl-3-sulfopropyl ether sodium salt (1.25 g) in deionized water (10 mL) was added to the vial and the vial was again placed in the oscillating water bath. After approximately 48 hours, the vial was removed from the water bath. There were two liquid phases in the vial. The top cloudy layer was removed using a pipette. The bottom yellow viscous layer was rinsed five times with deionized water and was then left exposed to the atmosphere at room temperature for several days to dry to afford the product.

Example 2

Preparation of a Polymerized Composition

A photoinitiator (0.01 g; IRGACURE 2959, Ciba, Tarrytown, N.Y.) was combined with the product of Example 1 (approximately 0.5 g). This mixture was placed onto a piece of 0.0254 millimeter-thick poly(ethylene terephthalate) (PET) film. The mixture was covered with a piece of silicone release liner and the mixture was spread between the PET and the release liner to provide an area of approximately 25.8 square centimeters (approximately 4 square inches). The mixture was then irradiated with light at a wavelength of 350 nanometers using a Sylvania BL350F ultraviolet bulb (available from Osram Sylvania, Danvers, Mass.) for 15 minutes to provide the polymerized composition of Example 2.

Preparative Example 3

A silica sol (20.0 g; obtained as a 16 weight percent aqueous sol under the trade designation NALCO 2326 from Nalco Co., Naperville, Ill.) was combined with deionized water (50 mL) in a screw cap jar. 2-[Methoxy(polyethyleneoxy)-propyl]trimethoxysilane (4.0 g; obtained from Gelest, Inc., Morrisville, Pa.) was added to the jar. The jar was placed in an oven at approximately 80° C. for approximately 24 hours. The water was then evaporated using a hot plate to heat the mixture to between approximately 80° C. to approximately 100° C. overnight to afford the product.

Comparative Example 4

The product of Preparative Example 3 (0.3 g) was combined with poly(ethylene glycol diacrylate) (0.2 g; obtained under the trade designation SR-344 from Sartomer Co., Inc., Exton, Pa.) and IRGACURE 2959. This mixture was placed onto a piece of 0.0254 millimeter-thick poly(ethylene terephthalate) (PET) film. The mixture was covered with a piece of silicone release liner and the mixture was spread between the PET and the release liner to provide an area of approximately 25.8 square centimeters (approximately 4 square inches). The mixture was then irradiated with light at a wavelength of 350 nanometers using a Sylvania BL350F ultraviolet bulb (available from Osram Sylvania, Danvers, Mass.) for 15 minutes to provide the polymerized mixture of Comparative Example 4.

Example 5 and Comparative Example 6

Evaluation of Antimicrobial Activity

The antimicrobial activity of each of the polymerized composition of Example 2 and the polymerized mixture of Comparative Example 4 was evaluated, essentially following the procedure of ASTM E2180-01 ("Standard Test for Determining the Activity of Incorporated Antimicrobial Agent(s) in Polymeric or Hydrophobic Materials"). Antimicrobial activity was evaluated against *Staphylococcus aureus* ATCC #6538 and against *Pseudomonas aeruginosa* ATCC #9027.

In summary, 0.5 mL aliquots of a 0.6% agar slurry (0.85% NaCl), each comprising $1\text{-}5 \times 10^6$ bacteria per milliliter, were pipetted onto each of the polymerized composition of Example 2 and the polymerized mixture of Comparative Example 4. The inoculated samples were incubated approximately 20 hours at 37° C. The samples and agar slurry were then added to 10 mL Difco Dey Engley Neutralizing Broth (NB), sonicated for approximately 1 minute and were then and mixed approximately 1 minute using a vortex mixer. An aliquot from the NB was diluted into phosphate-buffered saline (PBS) and plated onto tryptic soy agar (TSA). The agar plates were incubated for approximately 24 hours at 37° C., the colonies were then counted, and viable bacteria remaining on the test samples were calculated. The percent reduction in viable bacteria was then calculated. The results are given in Table 1. In Table 1, "CE 4" means Comparative Example 4, and "CE 6" means Comparative Example 6.

TABLE 1

Data for Example 3 and Comparative Example 3.

| | | Percent Reduction of Microorganism | |
|---|---|---|---|
| Example | Composition | S. aureus | P. aeruginosa |
| 5 | Example 2 | 99.9% | 0% |
| CE 6 | CE 4 | 0% | 0% |

Example 7 and Comparative Example 8

Evaluation of Antifouling Activity

Approximately half of one glass microscope slide was coated with a mixture of polymerizable composition and IRGACURE 2959 as described in Example 2. The composition was covered with a piece of release liner, and the sample was then irradiated with light at a wavelength of 350 nanometers for 15 minutes to provide a polymerized composition on approximately half of the microscope slide. Another microscope slide was similarly prepared using the polymerizable mixture as described in Comparative Example 4. Each microscope slide was placed in a flat plate flow cell (FC 81, Biosurface Technologies Corp, Bozeman, Mont.). Each flow cell was washed overnight using deionized water. Flow cells were then exposed to 70% aqueous ethanol for approximately 30 minutes followed by a wash with sterile deionized water for 1 hour to sterilize the apparatus and the slide. A suspension of S. aureus strain MN8 (approximately $10^8$ cells per mL in tryptic soy broth (TSB) diluted 1:50 in PBS) was then passed through the flow cells for approximately 2 hours. The suspension of S. aureus was then replaced with a reservoir of sterile growth medium, TSB diluted 1:50 in PBS, which was passed through each flow cell for approximately 4 days to allow biofilm formation by attached S. aureus. The flow cells were then exposed to a dilute aqueous crystal violet solution (approximately 0.1% (w/v)) for 15 minutes followed by a wash with deionized water until excess crystal violet was no longer visible in the effluent. The flow rates were approximately 1 milliliter per minute, and the incubations were at room temperature. Visual inspection for stained biofilm on the microscope slide of Example 7 showed less staining on the portion having the coating of the polymerized composition. Visual inspection of the microscope slide of Comparative Example 8 showed a similar degree of staining of both portions (coated and uncoated) of the slide.

Various modifications and alterations to this invention will become apparent to those skilled in the art without departing from the scope and spirit of this invention. It should be understood that his invention is not intended to be unduly limited by the illustrative embodiments and examples set forth herein and that such examples and embodiments are presented by way of example only with the scope of the invention intended to be limited only by the claims set forth herein as follows.

What is claimed is:
1. A polymerizable composition comprising:
a) a first cationic nanoparticle component comprising
i) cationic covalently bonded ammonium groups and;
ii) optionally comprising covalently bonded ethylenically unsaturated polymerizable groups; and
b) a second anionic component comprising
i) an anionic polyether compound and
ii) optionally an ethylenically unsaturated polymerizable anionic compound,
wherein the polymerizable composition comprises at least one of a) ii). or b) ii).
2. The composition of claim 1 further comprising a third component comprising an ethylenically unsaturated (meth)acrylate monomer.
3. The composition of claim 1 comprising
a) a first cationic nanoparticle component comprising
i) cationic covalently bonded ammonium groups and;
ii) covalently bonded ethylenically unsaturated polymerizable groups; and
b) a second anionic component comprising
i) an anionic polyether compound and
ii) an ethylenically unsaturated polymerizable anionic compound.
4. The composition of claim 3 wherein the anionic polyether compound of the second component and the ethylenically unsaturated polymerizable anion of the second component each independently comprise an anionic group selected from the group consisting of carboxylate, sulfonate, phosphate, and phosphonate.
5. The composition of claim 3 wherein the ethylenically unsaturated polymerizable groups each independently comprise a (meth)acrylate group or a (meth)acrylamide group.
6. The composition of claim 1 wherein the ammonium groups and the ethylenically unsaturated polymerizable groups of the cationic nanoparticles are covalently bonded to the nanoparticle via a siloxane linkages.
7. The composition of claim 1 wherein the covalently bonded ammonium group comprises a pyridinium group of Formula II

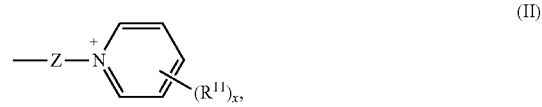

wherein Z is a divalent spacer group, each $R^{11}$ is independently a hydrogen atom, an alkyl group, or a halo group, and x is an integer of 1 to 5.

8. The composition of claim 1 wherein the covalently bonded ammonium group is of Formula I

wherein $R^1$, $R^2$, and $R^3$ are each independently a hydrogen atom, an alkyl or heteroalkyl group having 1 to 20 carbon atoms, an aryl group having 4 to 10 carbon atoms, or wherein $R^2$ and $R^3$ together form a ring, wherein not more than two of $R^1$, $R^2$, and $R^3$ is a hydrogen atom, and wherein Z is a divalent spacer group.

9. The composition of claim 1 wherein the anionic polyether compound is of Formula V

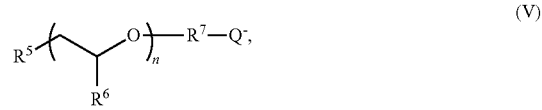

wherein
$R^5$ is a hydrogen atom, an alkyl group, an aryl group, an aralkyl group, or an alkaryl group, or comprises an ethylenically unsaturated polymerizable group;
each $R^6$ is independently a hydrogen atom or a methyl group, or comprises an ethylenically unsaturated polymerizable group;

$R^7$ is an alkylene group or an arylene group;

$Q^-$ is an anionic group selected from the group consisting of carboxylate, sulfonate, phosphate, and phosphonate; and n is an integer from 1 to 100.

10. A method of making a coated article, the method comprising:

a) providing an article having a surface;

b) applying the composition of claim 1 to a surface of the article; and c) polymerizing the composition.

11. The method of claim 10 wherein the polymerizing step comprises directing actinic radiation to the composition.

12. The method of claim 10 wherein the composition further comprises an ethylenically unsaturated (meth)acrylate monomer.

13. The method of claim 10 wherein the article comprises ceramic, silicate, metal, or polymer or polymer/wood composites.

14. A coated article comprising a substrate, at least a portion of a surface of the substrate having the polymerized composition of claim 1 coated thereon, wherein at least a portion of the surface comprises an antimicrobial surface.

15. The article of claim 14 wherein the polymerized composition has solubility in water no greater than 10 weight percent.

16. The article of claim 14 wherein the cationic nanoparticle further comprises a covalently bonded ethylenically unsaturated polymerizable group.

17. The article of claim 14 wherein the second component further comprises an ethylenically unsaturated polymerizable anion.

\* \* \* \* \*